(12) United States Patent
Yang

(10) Patent No.: US 12,386,734 B2
(45) Date of Patent: Aug. 12, 2025

(54) DATA PROCESSING DEVICE AND ASSOCIATED MEMORY MANAGEMENT METHOD

(71) Applicant: Realtek Semiconductor Corp., HsinChu (TW)

(72) Inventor: Yi-Lin Yang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 21 days.

(21) Appl. No.: 18/636,295

(22) Filed: Apr. 16, 2024

(65) Prior Publication Data
US 2024/0370362 A1    Nov. 7, 2024

(30) Foreign Application Priority Data
May 4, 2023    (TW) .................................. 112116578

(51) Int. Cl.
*G06F 12/00*    (2006.01)
*G06F 12/02*    (2006.01)
(52) U.S. Cl.
CPC .................................. *G06F 12/023* (2013.01)
(58) Field of Classification Search
None
See application file for complete search history.

(56) References Cited

U.S. PATENT DOCUMENTS

| 11,886,340 B1* | 1/2024 | Tong | G06F 9/5016 |
| 2010/0115170 A1* | 5/2010 | Jeong | G06F 13/1663 710/308 |
| 2022/0080989 A1* | 3/2022 | Wada | G06F 21/554 |

FOREIGN PATENT DOCUMENTS

CN    103164278 A    6/2013

* cited by examiner

*Primary Examiner* — Daniel D Tsui
(74) *Attorney, Agent, or Firm* — Winston Hsu

(57) ABSTRACT

A data processing device includes a memory device, a central processing unit (CPU), and a data processing circuit. The memory device includes a first memory area and a second memory area, wherein the first memory area is arranged to store a first type of data, and the second memory area is arranged to store a second type of data. The CPU is coupled to the memory device, and is arranged to access the memory device, wherein the CPU accesses the first memory area and the second memory area of the memory device. The data processing circuit is coupled to the memory device, and is arranged to access the memory device, wherein the data processing circuit only accesses the first memory area of the memory device.

20 Claims, 6 Drawing Sheets

DATA PROCESSING DEVICE AND ASSOCIATED MEMORY MANAGEMENT METHOD

BACKGROUND OF THE INVENTION

1. Field of the Invention

The present invention is related to data processing, and more particularly, to a data processing device that can flexibly configure a memory space according to application scenarios, and an associated memory management method.

2. Description of the Prior Art

A data processing device such as a microprocessor chip is an essential hardware component for most electronic products. According to an electronic product's designated functions, the associated data processing device can implement a corresponding data processing program by executing software or firmware codes. This usually requires the data processing device to access a memory device. Further, without appropriate memory space allocation, it can significantly reduce data processing efficiency, and the memory space is easily wasted.

As a result, a novel memory management method and an associated data processing device are urgently needed.

SUMMARY OF THE INVENTION

According to an embodiment of the present invention, a data processing device is provided. The data processing device comprises a memory device, a central processing unit (CPU), and a data processing circuit. The memory device comprises a first memory area and a second memory area, wherein the first memory area is arranged to store a first type of data, and the second memory area is arranged to store a second type of data. The CPU is coupled to the memory device, and is arranged to access the memory device, wherein the CPU accesses the first memory area and the second memory area of the memory device. The data processing circuit is coupled to the memory device, and is arranged to access the memory device, wherein the data processing circuit only accesses the first memory area of the memory device.

According to another embodiment of the present invention, a memory management method for managing a memory device utilized by a data processing device is provided, wherein the data processing device comprises a CPU and a data processing circuit. The memory management method comprises: configuring a first memory area and a second memory area in the memory device, wherein the CPU has an authority to access the first memory area and an authority to access the second memory area, and the data processing circuit only has the authority to access the first memory area; storing a first type of data in the first memory device by the CPU or by the data processing circuit; and storing a second type of data in the second memory device by the CPU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
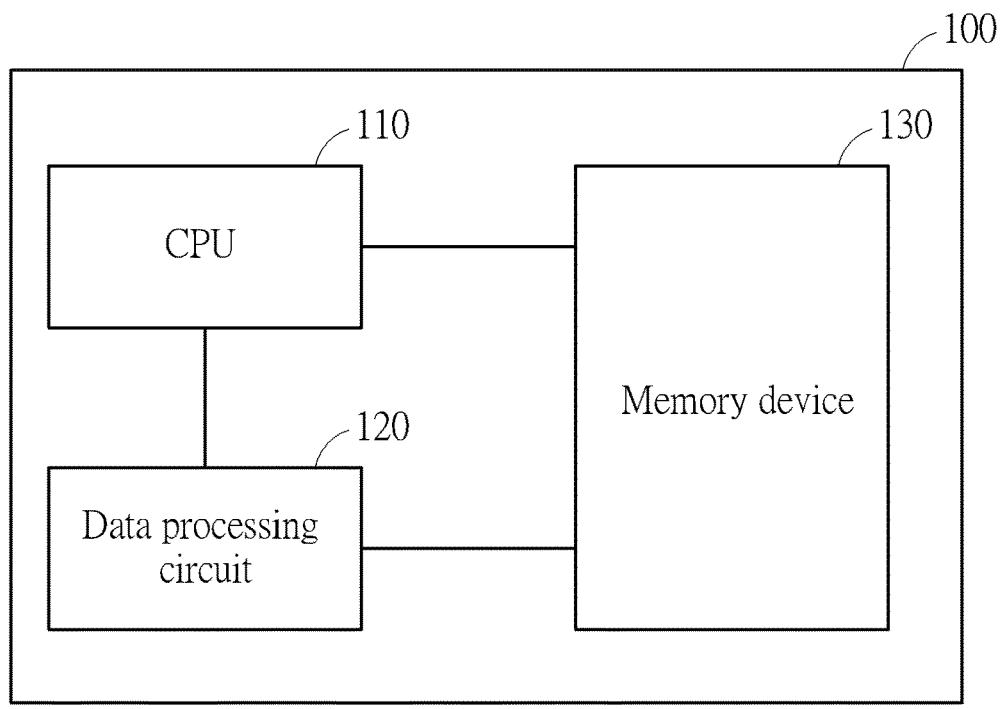
FIG. 1 is a block diagram of a data processing device according to an embodiment of the present invention.

FIG. 1 is a block diagram of a data processing device 100 according to an embodiment of the present invention, wherein the data processing device 100 at least includes a central processing unit (CPU) 110, a data processing circuit 120, and a memory device 130. The data processing device 100 may be implemented as a processor product, such as a microprocessor chip. The data processing device 100 may be designed according to functions required by the processor product, so that the data processing device 100 may execute corresponding software or firmware to implement a corresponding data processing program. The data processing circuit 120 may be any hardware device with an authority to access the memory device 130 within the data processing device 100. For example, the data processing circuit 120 may be a direct memory access (DMA) circuit or a signal processing circuit.

In order to increase the data processing efficiency of the data processing device 100 and reduce memory space wastage of the memory device 130, the memory space of the memory device 130 may be flexibly configured according to different application scenarios. For example, the memory device 130 may be configured to at least include (or be divided into) a first memory area and a second memory area. The CPU 110 has an authority to access the first memory area and an authority to access the second memory area. The data processing circuit 120 may be configured to at least have the authority to access the first memory area, or may be configured to only have the authority to access the first memory area.

According to an embodiment of the present invention, the application scenarios may include an application scenario wherein it is required to perform the data processing in real time and an application scenario wherein it is not required to perform the data processing in real time, wherein at least one hardware circuit within the data processing device 100 and at least one task executed by the CPU 110 may be associated with the application scenario wherein it is required to perform the data processing in real time, and at least another hardware circuit within the data processing device 100 and at least another task executed by the CPU 110 may be associated with the application scenario wherein it is not required to perform the data processing in real time. The hardware circuit or the task associated with the application scenario wherein it is required to perform the data processing in real time will be given the authority to access the first memory area. The hardware circuit or the task associated with the application scenario wherein it is not required to perform the data processing in real time will be given the authority to access the second memory area, but will not be given the authority to access the first memory area, to prevent occupying the memory resources of the first memory area. It should be noted that, since the tasks executed by the CPU 110 may include some tasks associated with the application scenario wherein it is required to perform the data processing in real time, and may also include other tasks associated with the application scenario wherein it is not required to perform the data processing in real time, the CPU 110 has the authority to access the first memory area and the authority to access the second memory area at the same time.

Figure 2:
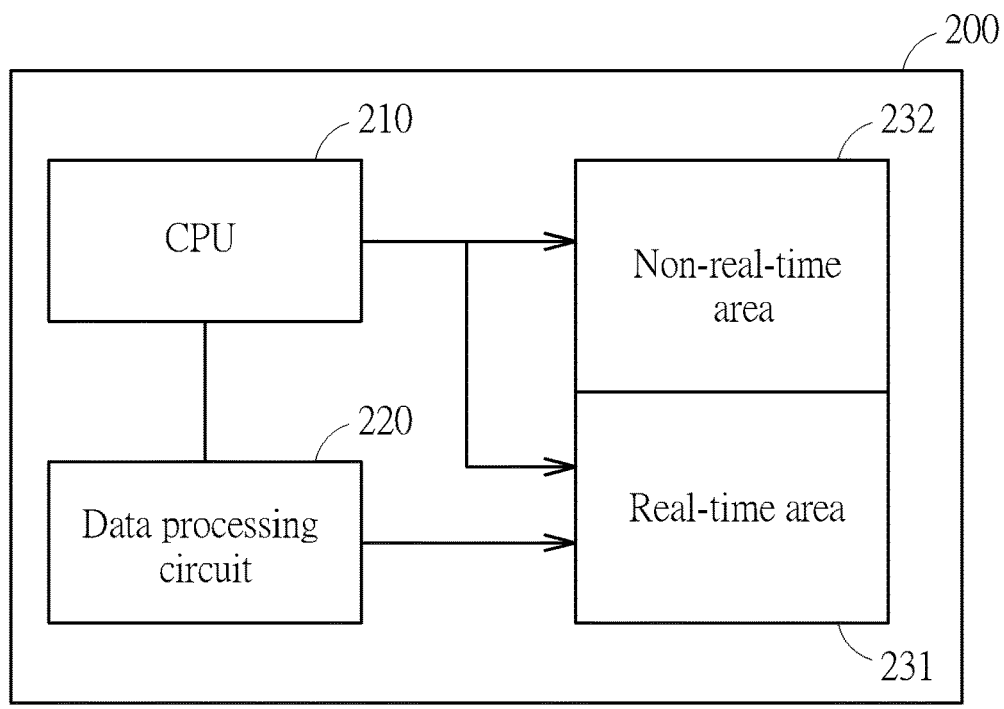
FIG. 2 is an example of an authority to access a memory area according to an embodiment of the present invention.

FIG. 2 is an example of an authority to access a memory area according to an embodiment of the present invention. In this embodiment, a data processing device 200 at least includes a CPU 210, a data processing circuit 220, and a memory device 230. The memory device 230 may be configured to include (or be divided into) a real-time area 231 and a non-real-time area 232. The data processing circuit 220 may be a hardware circuit associated with the application scenario required to perform the data processing in real time. As a result, the data processing circuit 220 may be given an authority to access the real-time area 231, and the CPU 210 may be given an authority to access the non-real-time area 232.

In addition, in order to distinguish the data streams and improve the data processing efficiency of the data processing device 200, the data processing circuit 220 may also only be given the authority to access the real-time area 231, so that the data processing circuit 220 may only access the real-time area 231 of the memory device 230. Similarly, the hardware circuit or the task associated with the application scenario wherein it is not required to perform the data processing in real time may also only be given the authority to access the non-real-time area 232 without being given the authority to access the real-time area 231, to prevent occupying the memory resources of the real-time area 231.

It should be noted that the memory device 130/230 in FIG. 1 and FIG. 2 is configured as a memory device inside the data processing device 100/200, but the present invention is not limited thereto. In some embodiments, the memory device that can be flexibly configured according to the memory management method proposed by the present invention can also be a memory device external to the data processing device. Therefore, the present invention is not limited to the device architecture of FIG. 1 and FIG. 2.

According to an embodiment of the present invention, the first memory area (or the real-time area) may be configured to store a first type of data. The second memory area (or the non-real-time area) may be configured to store a second type of data. Each data stored in the memory device 130/230 may be classified into the first type of data or the second type of data according to a processing time of the data, wherein a processing time of the first type of data is usually shorter than that of the second type of data.

According to an embodiment of the present invention, a processing time of each data may be a time length or a number of clock cycles (e.g. clock cycles of the CPU) required to use or process the data, wherein the time length or the number of clock cycles may be deduced in advance according to a number of instructions required to use or process the data and the clock cycles of the CPU required to execute each instruction.

According to another embodiment of the present invention, a processing time of each data may be a retaining time of the data in a corresponding memory area, wherein a retaining time of the first type of data in the first memory area may be shorter than that of the second type of data in the second memory area. For example, after required information is obtained from data by a hardware circuit or a software task, it is determined if the data is no longer needed, and the data may then be deleted from the corresponding memory area (i.e. the memory area storing the data is released). As a result, no matter whether the data is physically erased, it is determined that the data is no longer retained in the corresponding memory area.

According to another embodiment of the present invention, a data update rate of the first memory area (e.g. the real-time area) may be higher than that of the second memory area (e.g. the non-real-time area), wherein a data update rate of a memory area may correspond to a memory space release rate of the memory area. When a memory space is released, data stored in the memory space may be updated. For example, when the memory space is used to store new data, the data of the memory space is updated. Since data stored in the real-time area is data required to be processed in real time, and a processing time of the data is relatively shorter (or a retaining time of the data in the real-time area is relatively shorter), a data update rate/ memory space release rate of the real-time area (or the first memory area) may be higher than that of the non-real-time area (or the second memory area).

Figure 3:
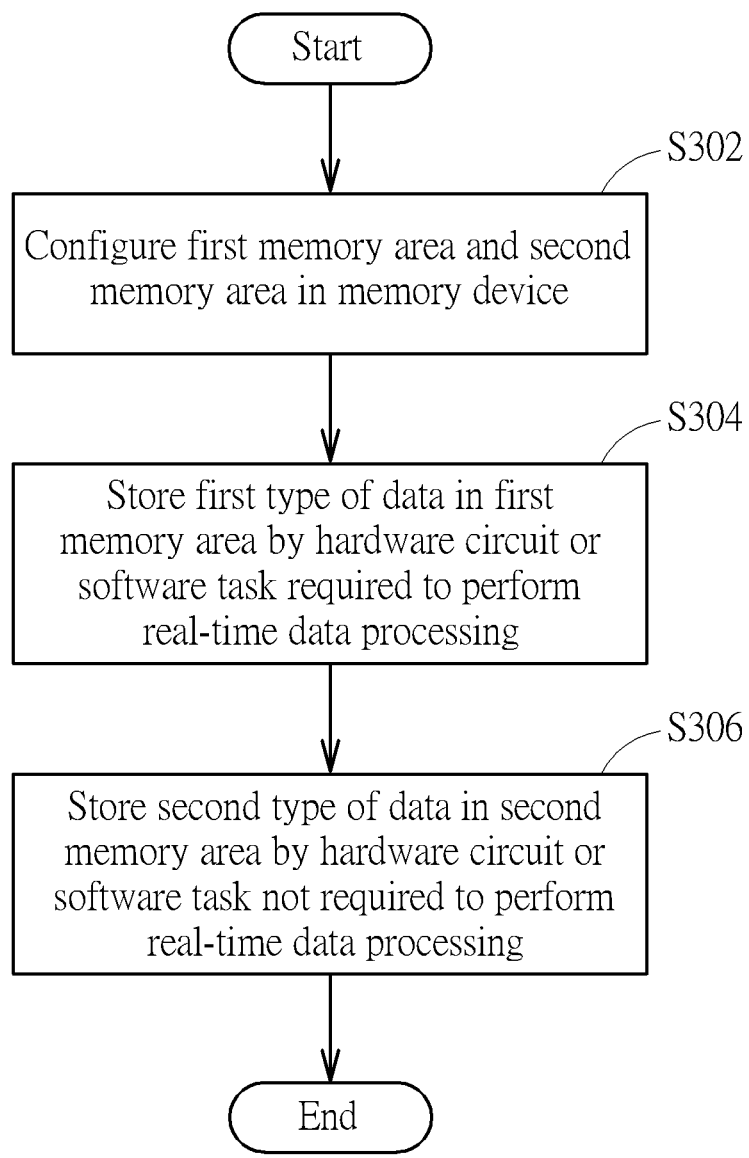
FIG. 3 is a flow chart of a memory management method according to an embodiment of the present invention.

FIG. 3 is a flow chart of a memory management method according to an embodiment of the present invention, and includes the following steps.

In Step S302, a first memory area and a second memory area are configured in a memory device, wherein a hardware circuit or a software task associated with application scenarios of real-time data processing may have an authority to access the first memory area, and a hardware circuit or a software task associated with application scenarios of non-real-time data processing may have an authority to access the second memory area.

In Step S304, a first type of data is stored in the first memory area by a hardware circuit or a software task that is required to perform the data processing in real time. For example, the first type of data is stored in the first memory area by a CPU executing the software task or by a data processing circuit.

In Step S306, a second type of data is stored in the second memory area by a hardware circuit or a software task that is not required to perform the data processing in real time. For example, the second type of data is stored in the second memory area by a CPU executing the software task or by other hardware circuits.

According to an embodiment of the present invention, the real-time area (or the first memory area) may be further divided into (or may include) a plurality of sub-areas. In a first embodiment of the present invention, one of the sub-areas may be exclusively allocated to one of a plurality of tasks executed by the CPU 110/210 (e.g. the task associated with the application scenario of real-time data processing), or may be exclusively allocated to a hardware circuit required to perform the real-time data processing (e.g. the data processing circuit 120/220). For brevity, in the following descriptions and FIGS. 4-6, the software task or the hardware circuit associated with the application scenario of the real-time data processing is uniformly named a real-time system, and the software task or the hardware circuit associated with the application scenario of the non-real-time data processing is uniformly named non-real-time system, wherein the real-time system may represent a software task or a hardware circuit that is required to perform real-time data processing, and the non-real-time system may represent a software task or a hardware circuit that is not required to perform real-time data processing.

Figure 4:
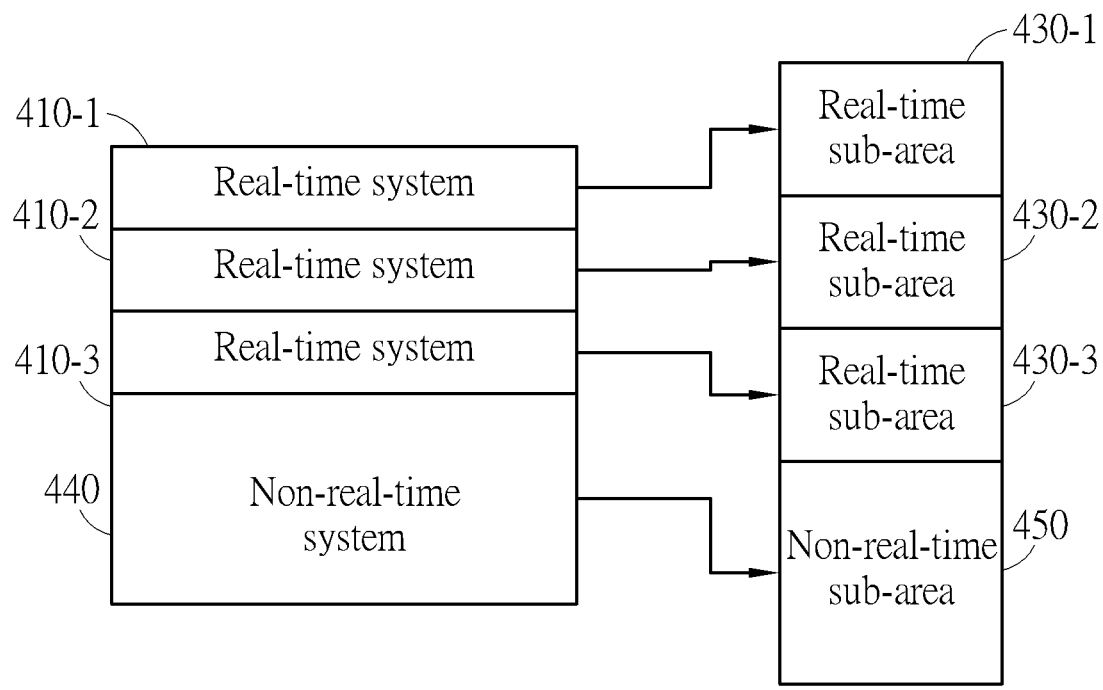
FIG. 4 is an example of a memory area configuration of a memory device according to a first embodiment of the present invention.

FIG. 4 is an example of a memory area configuration of a memory device according to a first embodiment of the present invention. In the first embodiment of the present invention, the real-time area (or the first memory area) is further divided into three sub-areas (hereinafter referred to as real-time sub-areas) 430-1, 430-2, and 430-3, and one of the real-time sub-areas may be exclusively allocated to one of a plurality of software tasks required to perform real-time data processing and executed by the CPU, or may be exclusively allocated to one of a plurality of hardware circuits required to perform real-time data processing (i.e. may be exclusively allocated to a real-time system), wherein the exclusive allocation represents a real-time sub-area which will be exclusively used by a corresponding real-time system. As shown in FIG. 4, the real-time sub-area 430-1 is exclusively used by a real-time system 410-1, the real-time sub-area 430-2 is exclusively used by a real-time system 410-2, and the real-time sub-area 430-3 is exclusively used by a real-time system 410-3. In addition, a non-real-time area (or the second memory area) 450 is used by a non-real-time system 440. By distinguishing the data streams, the present invention can prevent the memory resources of the real-time area from being occupied by the non-real-time system, and the data processing efficiency of the data processing device can be improved.

In a second embodiment of the present invention, at least one of the real-time sub-areas is set as a shared sub-area (hereinafter referred to as a shared real-time sub-area), wherein the shared real-time sub-area is shared by multiple real-time systems, and each of the remaining real-time sub-areas except for the shared real-time sub-area is exclusively allocated to a real-time system.

Figure 5:
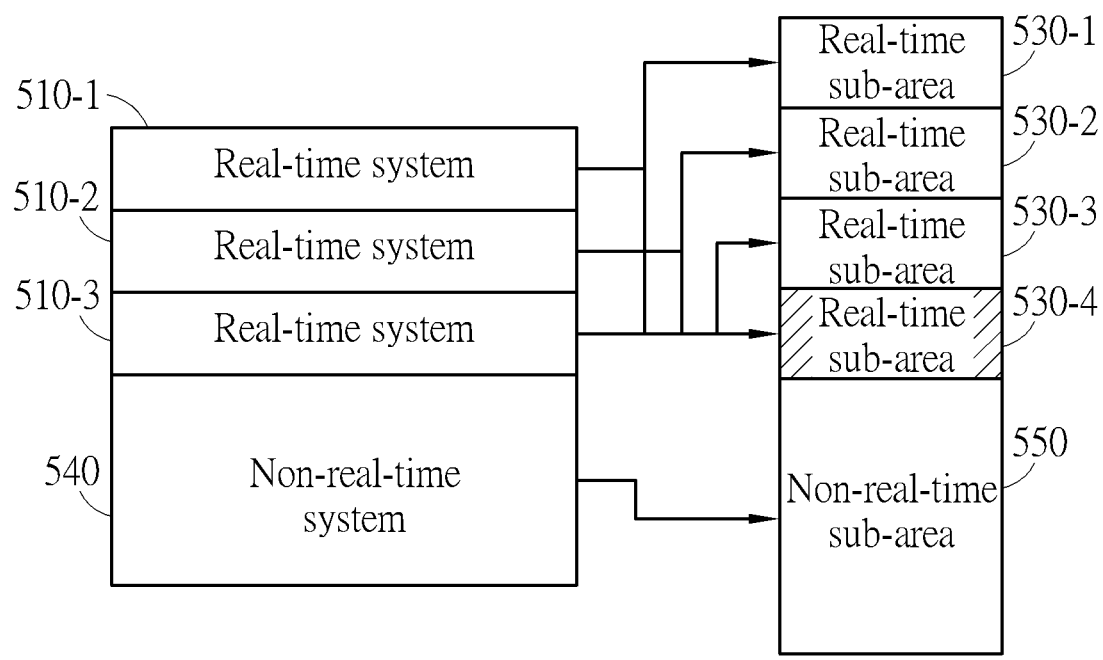
FIG. 5 is an example of a memory area configuration of a memory device according to a second embodiment of the present invention.

FIG. 5 is an example of a memory area configuration of a memory device according to a second embodiment of the present invention. In the second embodiment of the present invention, the real-time area (or the first memory area) is further divided into four sub-areas (hereinafter referred to as real-time sub-areas) 530-1, 530-2, 530-3, and 530-4, wherein the real-time sub-area 530-4 is a shared real-time sub-area. As shown in FIG. 5, the real-time sub-area 530-1 is exclusively used by a real-time system 510-1, the real-time sub-area 530-2 is exclusively used by a real-time system 510-2, the real-time sub-area 530-3 is exclusively used by a real-time system 510-3, and the real-time sub-area 530-4 is used by the real-time systems 530-1, 530-2, and 530-3. In addition, a non-real-time area (or the second memory area) 550 is used by a non-real-time system 540. In this way, in addition to distinguishing the data streams for preventing memory resources in the real-time area from being occupied by non-real-time systems and improving the data processing efficiency of the data processing device, the use of memory space will be more flexible since the shared real-time sub-area 530-4 can be dynamically and flexibly allocated to one of the software tasks (or hardware circuits) required to perform the real-time data processing. For example, when an exclusive real-time sub-area space of a real-time system is insufficient, the memory space of the shared real-time sub-area 530-4 can be used.

Figure 6:
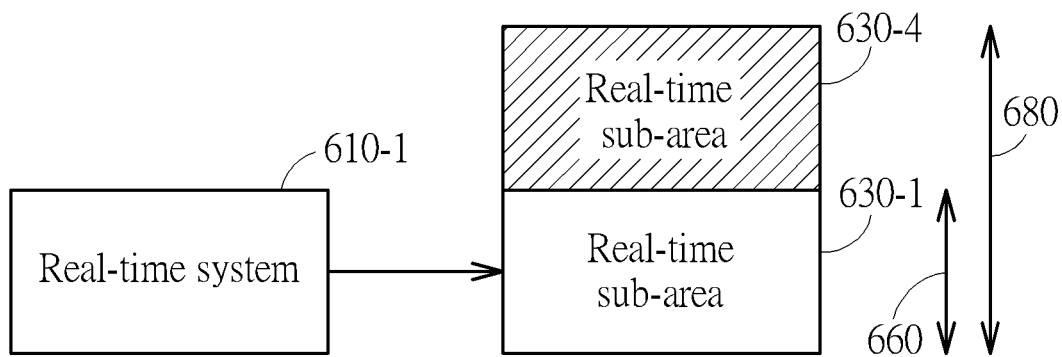
FIG. 6 is an example of using a shared real-time sub-area to expand a usage space of a real-time sub-area according to a second embodiment of the present invention.

FIG. 6 is an example of using a shared real-time sub-area to expand a usage space of a real-time sub-area according to a second embodiment of the present invention. In the example, a real-time sub-area 630-1 is exclusively used by a real-time system 610-1, and a real-time sub-area 630-4 is a shared real-time sub-area. As a result, a memory size that can be used by the real-time system 610-1 is between an exclusive usage 660 and a maximum usage 680.

According to an embodiment of the present invention, real-time sub-area may be further divided into (or may include) a plurality of access blocks with the same size, wherein each access block may correspond to a bit for recording a state of the each access block. For example, the bit may be arranged to record whether a corresponding access block is in a free state or a used state, wherein the free state indicates valid data has not been written into the corresponding access block, and the used state indicates the valid data has been written into the corresponding access block. In other words, an access block in the free state is an access block where data can still be written.

In addition, in an embodiment of the present invention, the CPU 110/210 may maintain a free map for each real-time sub-area, wherein the free map may include a plurality of bits, and each bit corresponds to an access block, and is arranged to record a state of the access block. The CPU 110/210 may store the free map in an internal memory or the memory device 130/230.

Figure 7:
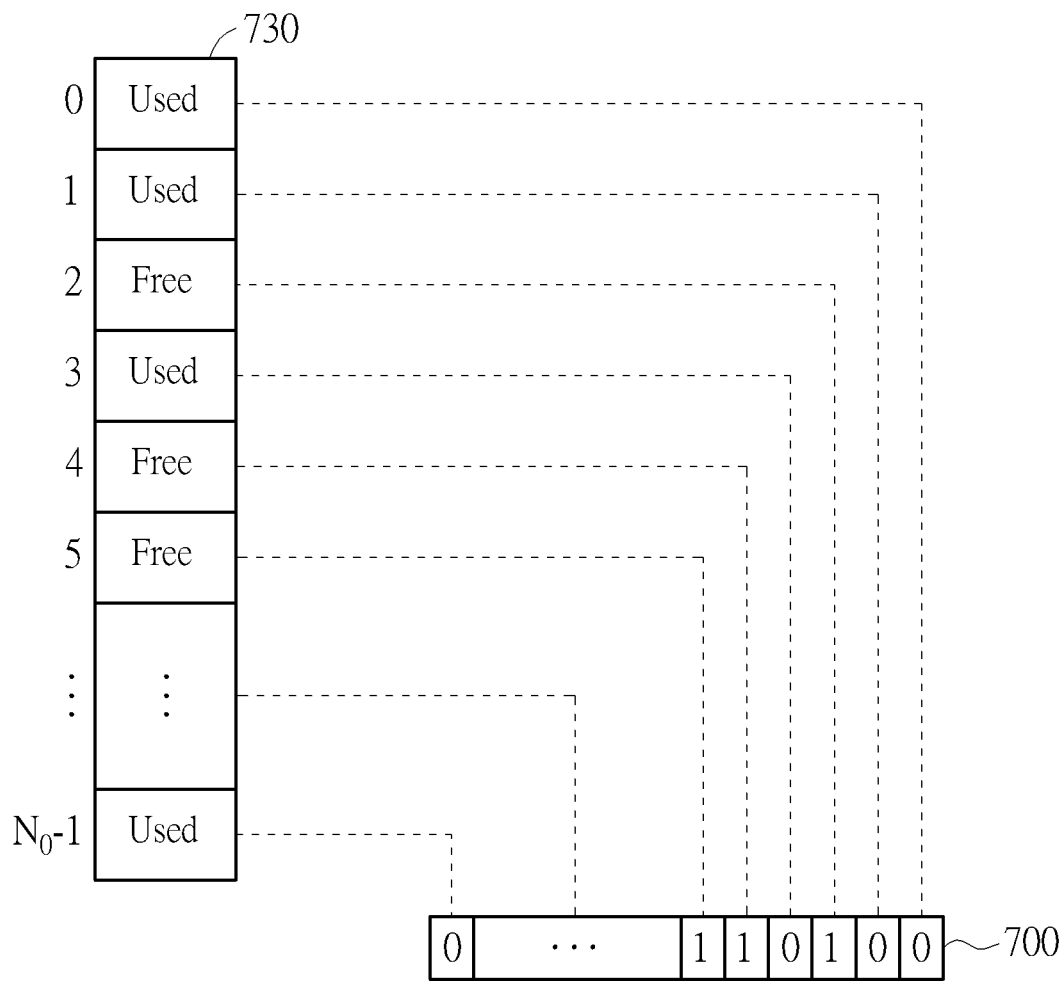
FIG. 7 is a diagram illustrating a free map according to an embodiment of the present invention.

FIG. 7 is a diagram illustrating a free map 700 according to an embodiment of the present invention. Assume that the free map 700 corresponds to a real-time sub-area 730 for recording a state of each access block of the real-time sub-area 730, and the real-time sub-area 730 includes $N_0$ access blocks with the same size (e.g. $N_0$ access blocks with the same size that correspond to index values 0, 1, 2, . . . , ($N_0$−1) in sequence). For example, the free map 700 may include $N_0$ bits, and each bit is arranged to record a state of an access block. As shown in FIG. 7, since access blocks with the index values 2, 4, and 5 are currently in the free state, values of corresponding bits may be set as 1 in the free map 700 for representing valid data has not been written into the corresponding access blocks, and values of the remaining bits may be set as 0 for representing the valid data has been written into the corresponding access blocks (i.e. the corresponding access blocks are in the used state).

According to an embodiment of the present invention, access blocks included in at least two of the sub-areas (e.g. at least two of the real-time sub-areas) may have different sizes. Specifically, an access block size may be selected as a suitable size according to access requirements of a corresponding real-time system. For example, assume that a first real-time system is arranged to process data of a big packet, wherein a size of the big packet may be 512 bytes, and an access block size for a real-time sub-area allocated to the first real-time system may be 512 bytes. Assume that a second real-time system is arranged to process data of a small packet, wherein a size of the small packet may be 128 bytes, and an access block size for a real-time sub-area allocated to the second real-time system may be 128 bytes.

Figure 8:
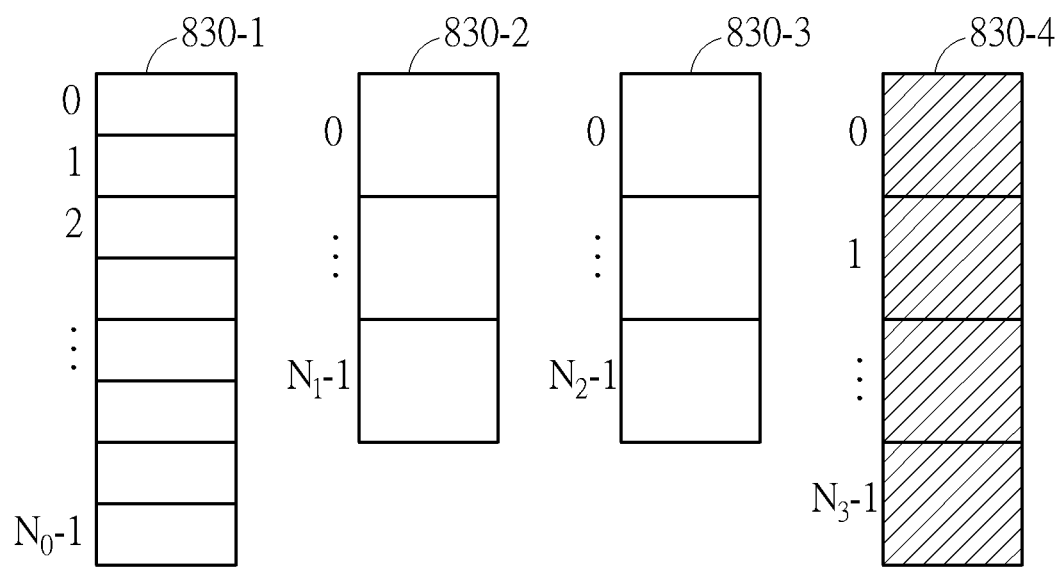
FIG. 8 is a diagram of flexibly configuring an access block size for different real-time sub-areas according to an embodiment of the present invention.

FIG. 8 is a diagram of flexibly configuring an access block size for different real-time sub-areas according to an embodiment of the present invention. In this embodiment, the real-time area of the memory device may at least include real-time sub-areas 830-1, 830-2, 830-3, and 830-4, wherein the real-time sub-area 830-4 may be a shared real-time sub-area. The real-time sub-area 830-1 includes $N_0$ access blocks with the same size (e.g. access blocks corresponding to index values 0, 1, 2, . . . , ($N_0$−1) in sequence). The real-time sub-area 830-2 includes $N_1$ access blocks with the same size (e.g. access blocks corresponding to index values 0, 1, 2, . . . , ($N_1$−1) in sequence). The real-time sub-area 830-3 includes Ne access blocks with the same size (e.g. access blocks corresponding to index values 0, 1, 2, . . . , (N=−1) in sequence). The real-time sub-area 830-4 includes $N_3$ access blocks with the same size (e.g. access blocks corresponding to index values 0, 1, 2, . . . , ($N_3$−1) in sequence).

In this embodiment, an access block size of the real-time sub-area 830-1 is smaller than that of the real-time sub-areas 830-2, 830-3, and 830-4.

In a second embodiment of the present invention, since the shared real-time sub-area is not exclusively allocated to any real-time system, an access block size of the shared real-time sub-area may be designed flexibly. For example, the access block size of the shared real-time sub-area may be set as the minimum block size, the maximum block size, an average block size required by all real-time systems, or may be set as a required access block size for a real-time system that is most likely to use the shared real-time sub-area.

According to an embodiment of the present invention, the CPU 110/210 may move data stored in the real-time area (e.g. the first memory area) to the non-real-time area (e.g. the second memory area) according to data processing requirements. For example, after a real-time system completes required data processing operations by accessing data stored in a corresponding real-time sub-area, if it is determined the data is still needed by subsequent data processing programs, and the subsequent data processing programs are non-real-time data processing and may be performed by another non-real-time system, the CPU 110/210 may move the data from the real-time area to the non-real-time area for the non-real-time system.

Figure 9:
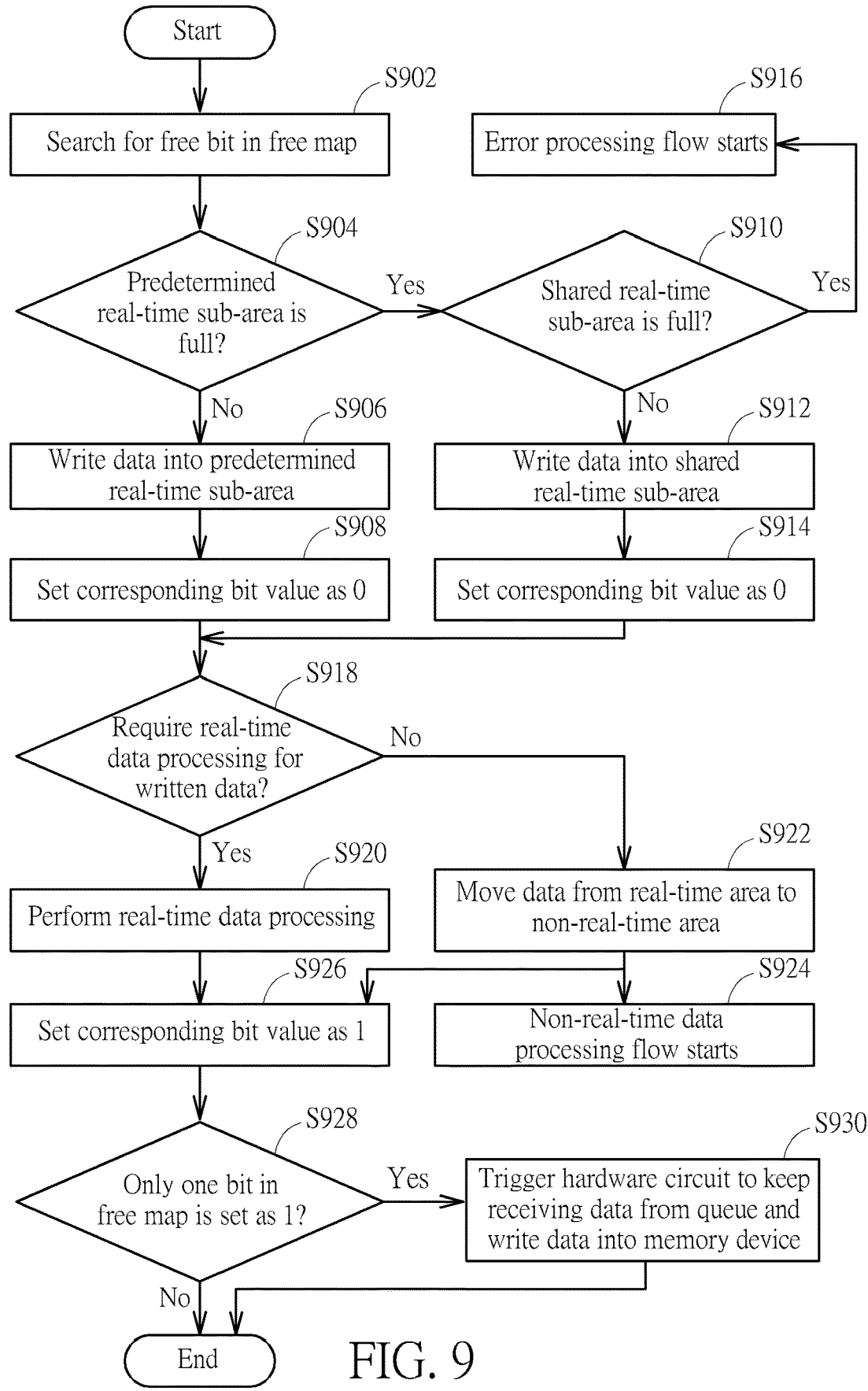
FIG. 9 is a flow chart of a memory management method according to an embodiment of the present invention.

FIG. 9 is a flow chart of a memory management method according to an embodiment of the present invention. FIG. 9 is a detailed flow chart, and may be arranged to illustrate a memory configuration of a real-time system and a corresponding memory management flow.

In this embodiment, the application scenario of the real-time data processing may include receiving input data from an external queue or other hardware queues, or moving data from a source terminal to the memory device 130/230. As a result, the above operations of receiving data may be performed by a real-time system. The flow of FIG. 9 may start with a predetermined real-time system receiving input data, and may include the following steps.

In Step S902, a free bit in a corresponding free map of a predetermined real-time sub-area allocated to the predetermined real-time system is searched, wherein the free bit represents a bit set as the free state (e.g. the bit value 1). As shown in FIG. 7, each bit value in the free map may record whether a corresponding access block is a used access block or a free access block, and the predetermined real-time system may correspondingly obtain an index value of the free access block by searching for the free bit in the free map.

In Step S904, it is determined whether the predetermined real-time sub-area is full according to a search result. For example, in Step S902, a variable being an integer can be used to search for the free bit in the free map by accumulating a value of the variable from 0. If no free bit is found until the value of the variable is accumulated to a value Np, the search result may be set to be full, which represents a corresponding predetermined real-time sub-area is full, wherein the value Np is a number of access blocks included in the predetermined real-time sub-area. If the free bit is found before the value of the variable is accumulated to the value Np (e.g. at least one bit with the bit value 1 is found in the corresponding free map), the search result may be set as the value of the variable when the free bit is found. According to the search result, if the predetermined real-time sub-area is full, Step S910 is entered. If the predetermined real-time sub-area is not full, Step S906 is entered.

In Step S906, data is written into (e.g. is allocated to) the predetermined real-time sub-area of the predetermined real-time system. The predetermined real-time system may deduce a memory address of a free access block according to an obtained variable value, a starting memory address of the predetermined real-time sub-area, and an access block size, and write the data into the free access block.

In Step S908, a bit value corresponding to an access block with written data in Step S906 in the free map is set as 0, for representing valid data has been written into the access block (e.g. the access block is in a used state).

In Step S910, it is determined whether the shared real-time sub-area is full. The predetermined real-time system may search for a free map corresponding to the shared real-time sub-area by the above-mentioned variable, to check whether a free bit exists and further determine whether the shared real-time sub-area is full. If Yes, Step S916 is entered; if No, Step S912 is entered.

In Step S912, data is written into the shared real-time sub-area. Similarly, the predetermined real-time system may deduce a memory address of a free access block in the shared real-time sub-area according to the variable value obtained in Step S910, a starting memory address of the shared real-time sub-area, and an access block size, and may write data into a free access block.

In Step S914, a bit value corresponding to an access block with written data in Step S912 in the free map is set as 0, for representing valid data has been written into the access block (e.g. the access block is in a used state).

In Step S916, the real-time data processing ends, and an error processing flow starts. Since both the predetermined real-time sub-area and the shared real-time sub-area that can be used by the predetermined real-time system are full, a current memory configuration may be inappropriate or there may be errors. As a result, the error processing flow is required to be triggered for trying to search for and fix the errors.

In Step S918, it is determined whether a real-time data processing is required to be performed upon the written data. If Yes, Step S920 is entered; if No, Step S922 is entered.

In Step S920, the required real-time data processing is performed by the predetermined real-time system. After the required real-time data processing is completed, Step S926 is entered.

In Step S922, data is moved from the real-time area to the non-real-time area by the CPU for the non-real-time system.

In Step S924, a non-real-time data processing flow starts. It should be noted that the non-real-time data processing flow and the real-time data processing flow may be performed in parallel. As a result, the CPU may perform Steps S924 and S926 after Step S922 is completed.

In Step S926, a bit value corresponding to an access block with written data in Step S906 in the free map is set as 1, for representing the access block is in a free state.

In Step S928, it is determined whether only one bit in a free map corresponding to the predetermined real-time sub-area or the shared real-time sub-area is a free bit. If Yes, it means that the demand for the memory space is currently large (i.e. there may still be data stuck in the external queue or other hardware queues and waiting to be written into the memory device 130/230), and Step S930 is entered. If No, the flow ends. It should be noted that the present invention is not limited to the setting of determining whether only one bit is a free bit, and the method can also determine whether multiple bits (e.g. a predetermined number of bits) are free bits in Step S928.

In Step S930, the hardware circuit is triggered to keep receiving data from the queue, and write the data into the memory device 130/230 by the predetermined real-time system or any real-time system.

In summary, by allocating an exclusive real-time sub-area to each real-time system, each real-time system can retain a basic usage space, and a corresponding real-time sub-area can be divided into access blocks with the same size according to requirements of each real-time system, wherein free access blocks in the real-time sub-area can be quickly found by using index values and bit values recorded in a free map. This can greatly reduce a number of clock cycles required to search for available memory space in an existing design, and therefore can effectively shorten the time required to perform the memory configuration. In addition, by additionally configuring a shared real-time sub-area, the real-time sub-area space available to each real-time system can be flexibly expanded, which makes the memory utilization more efficient.

In addition, real-time data stream and non-real-time data stream can be clearly distinguished, and hardware circuits or software tasks associated with application scenarios of non-real-time data processing can be restricted from accessing the real-time area, to prevent occupying memory resources in the real-time area, and effectively avoid a situation where the real-time system and the non-real-time system compete for the memory resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing device, comprising:
    a memory device, comprising a first memory area and a second memory area;
    a central processing unit (CPU), coupled to the memory device, and arranged to access the memory device, wherein the CPU accesses the first memory area and the second memory area of the memory device; and
    a data processing circuit, coupled to the memory device, and arranged to access the memory device, wherein the data processing circuit only accesses the first memory area of the memory device;
    wherein the first memory area is arranged to store a first type of data, and the second memory area is arranged to store a second type of data.

2. The data processing device of claim 1, wherein each data stored in the memory device is classified into the first type of data and the second type of data according to a processing time of the data.

3. The data processing device of claim 2, wherein a processing time of the first type of data is shorter than a processing time of the second type of data.

4. The data processing device of claim 1, wherein a time of the first type of data being retained in the first memory area is shorter than a time of the second type of data being retained in the second memory area.

5. The data processing device of claim 1, wherein a data update rate of the first memory area is higher than a data update rate of the second memory area.

6. The data processing device of claim 1, wherein the CPU is further arranged to move data stored in the first memory area to the second memory area.

7. The data processing device of claim 1, wherein the first memory area is divided into a plurality of sub-areas, and each of the plurality of sub-areas comprises a plurality of access blocks with a same size.

8. The data processing device of claim 7, wherein the plurality of access blocks comprised in at least two of the plurality of sub-areas have different sizes.

9. The data processing device of claim 7, wherein one of the plurality of sub-areas is exclusively allocated to one of a plurality of tasks executed by the CPU, and another of the plurality of sub-areas is exclusively allocated to the data processing circuit.

10. The data processing device of claim 7, wherein the plurality of sub-areas comprise a shared sub-area, the shared sub-area is shared by a plurality of tasks executed by the CPU and the data processing circuit, and one of the remaining sub-areas in the plurality of sub-areas except for the shared sub-area is exclusively allocated to the data processing circuit or one of a plurality of tasks executed by the CPU.

11. A memory management method for managing a memory device utilized by a data processing device, wherein the data processing device comprises a central processing unit (CPU) and a data processing circuit, and the memory management method comprises:
    configuring a first memory area and a second memory area in the memory device, wherein the CPU has an authority to access the first memory area and an authority to access the second memory area, and the data processing circuit only has the authority to access the first memory area;
    storing a first type of data in the first memory device by the CPU or by the data processing circuit; and
    storing a second type of data in the second memory device by the CPU.

12. The memory management method of claim 11, wherein a processing time of the first type of data is shorter than a processing time of the second type of data.

13. The memory management method of claim 11, wherein a time of the first type of data being retained in the first memory area is shorter than a time of the second type of data being retained in the second memory area.

14. The memory management method of claim 11, wherein a data update rate of the first memory area is higher than a data update rate of the second memory area.

15. The memory management method of claim 11, further comprising:
    moving data stored in the first memory area to the second memory area.

16. The memory management method of claim 11, wherein the first memory area is divided into a plurality of sub-areas, and each of the plurality of sub-areas comprises a plurality of access blocks with a same size.

17. The memory management method of claim 16, wherein the plurality of access blocks comprised in at least two of the plurality of sub-areas have different sizes.

18. The memory management method of claim 16, further comprising:
    exclusively allocating one of the plurality of sub-areas to one of a plurality of tasks executed by the CPU; and
    exclusively allocating another of the plurality of sub-areas to the data processing circuit.

19. The memory management method of claim 16, wherein the plurality of sub-areas comprise a shared sub-area, and the memory management method further comprises:
   exclusively allocating one of the remaining sub-areas in the plurality of sub-areas except for the shared sub-area to the data processing circuit or one of a plurality of tasks executed by the CPU.

20. The memory management method of claim 19, further comprising:
   dynamically allocating the shared sub-area to the data processing circuit or the one of the plurality of tasks.

* * * * *